United States Patent
Eriksen et al.

(10) Patent No.: US 10,267,458 B2
(45) Date of Patent: Apr. 23, 2019

(54) HYDROGEN STORAGE AND RELEASE ARRANGEMENT

(71) Applicant: Hystorsys AS, Kjeller (NO)

(72) Inventors: Jon Eriksen, Frogner (NO); Roman Denys, Lillestrom (NO); Christopher Kloed, Kongsberg (NO)

(73) Assignee: Hystorsys AS, Kjeller (NO)

( * ) Notice: Subject to any disclaimer, the term of this patent is extended or adjusted under 35 U.S.C. 154(b) by 0 days.

(21) Appl. No.: 15/715,827

(22) Filed: Sep. 26, 2017

(65) Prior Publication Data

US 2019/0093825 A1 Mar. 28, 2019

(51) Int. Cl.
*F17C 11/00* (2006.01)
*C01B 3/06* (2006.01)
*C01B 3/00* (2006.01)

(52) U.S. Cl.
CPC .......... *F17C 11/005* (2013.01); *C01B 3/0031* (2013.01); *C01B 3/065* (2013.01); *F17C 2221/012* (2013.01)

(58) Field of Classification Search
CPC ............. F17C 11/005; F17C 2221/012; C01B 3/0031; C01B 3/065
USPC .................................................... 165/104.12
See application file for complete search history.

(56) References Cited

U.S. PATENT DOCUMENTS

| | | | |
|---|---|---|---|
| 4,185,979 A | 1/1980 | Woolley | |
| 4,402,187 A | 9/1983 | Golben et al. | |
| 5,019,358 A | 5/1991 | Suzuki et al. | |
| 7,455,723 B2 | 11/2008 | Voss et al. | |
| 2004/0231823 A1* | 11/2004 | Tsuji | C01B 3/0005 165/10 |
| 2005/0000234 A1 | 1/2005 | Kimbara et al. | |
| 2007/0274882 A1 | 11/2007 | Mosler et al. | |
| 2009/0107853 A1 | 4/2009 | Tan et al. | |
| 2010/0219087 A1 | 9/2010 | Fujita et al. | |
| 2012/0028140 A1 | 2/2012 | Sutherland | |
| 2014/0311348 A1 | 10/2014 | Baichtok | |

FOREIGN PATENT DOCUMENTS

| | | | |
|---|---|---|---|
| JP | S61144498 A | 7/1986 | |
| JP | S62171600 A | 7/1987 | |
| JP | 2001173899 A | 6/2001 | |
| JP | 2002081597 A | 3/2002 | |
| JP | 2004340530 A | 12/2004 | |

\* cited by examiner

*Primary Examiner* — Jianyng Atkisson
*Assistant Examiner* — Joel Attey
(74) *Attorney, Agent, or Firm* — Christopher & Weisberg, P.A.

(57) ABSTRACT

A hydrogen storage and release arrangement comprising a vessel having a first end, a second end and an interior volume. The arrangement includes a first set of tubes extending into the interior volume from the first end of the vessel. Tubes of the first set of tubes each comprise a metal hydride. The arrangement further includes a second set of tubes, where tubes of the second set of tubes each include a metal hydride. The metal hydride of the first set of tubes and the metal hydride of the second set of tubes are arranged to absorb and desorb hydrogen gas in response to temperature changes caused by heat exchange fluid. The second set of tubes extends into the interior volume from the second end of the vessel. The embodiments herein also relate to use of a hydrogen storage and release arrangement and a method for storing and releasing hydrogen.

12 Claims, 4 Drawing Sheets

HYDROGEN STORAGE AND RELEASE ARRANGEMENT

CROSS-REFERENCE TO RELATED APPLICATION n/a

STATEMENT REGARDING FEDERALLY SPONSORED RESEARCH OR DEVELOPMENT n/a

TECHNICAL FIELD

The present invention relates to a hydrogen storage and release arrangement. The embodiments herein also relate to a use of a hydrogen storage and release arrangement and a method for storing and releasing hydrogen.

BACKGROUND

Hydrogen storage and release arrangements, such as hydrogen compressors, using metal hydride to cyclically absorb and desorb hydrogen gas, have been used for some years. The arrangements are usually arranged such that the metal hydride is in thermal contact with a compartment where heat exchange fluid is arranged to be transferred. When heat exchange fluid having a low temperature is circulated through such compartment, the metal hydride is arranged to absorb hydrogen gas and when heat exchange fluid having a high temperature is circulated, the metal hydride is arranged to desorb hydrogen gas. Such arrangements are capable of increasing pressure of hydrogen gas from a lower pressure level to a higher pressure level according to a temperature difference, that is, compressor work can be carried out by a low-grade energy carrier rather than a high-grade energy carrier such as electricity heavily consumed by compressor systems today. Since the thermal energy may be in the form of waste heat from a factory, an industrial process, geothermal heat or similar, such arrangements are capable of increasing pressure of hydrogen gas from a lower pressure level to a higher pressure level in an environmental friendly manner.

In the prior art, several hydrogen storage and release arrangements have been described. For example, the document U.S. Pat. No. 7,455,723 B2 relates to hydrogen storage and release for storing and releasing hydrogen from a metal hydride contained in the device based on heat transfer to or from a coolant flow provided through the device.

In view of the hydrogen storage and release arrangements previously described, there is room for improvement, especially with regard to energy efficiency, spatial requirements, maintenance and service, and manufacturing aspects. Therefore, there is a need for an improved hydrogen storage and release arrangement.

SUMMARY

One object of the disclosure is to reduce or ameliorate at least one of the disadvantages of the prior art arrangements and/or methods, or to provide a useful alternative.

According to an aspect of the embodiments herein, the object is achieved by a hydrogen storage and release arrangement comprising a vessel having a first end, a second end and an interior volume, the vessel further comprising a heat exchange fluid inlet and a heat exchange fluid outlet by which heat exchange fluid is arranged to be transferred, by heat exchange fluid transferring means, through the interior volume of the vessel, the arrangement further comprising a first set of tubes, where tubes of the first set of tubes each comprises a metal hydride, and a second set of tubes, where tubes of the second set of tubes each comprises a metal hydride, where the metal hydride of the first set of tubes and the metal hydride of the second set of tubes are arranged to absorb and desorb hydrogen gas in response to temperature changes caused by the heat exchange fluid, and wherein the arrangement comprises ducts for supplying and removing hydrogen gas to and from the metal hydride of the first set of tubes and ducts for supplying and removing hydrogen gas to and from the metal hydride of the second set of tubes, wherein the first set of tubes extends into the interior volume from the first end of the vessel and the second set of tubes extends into the interior volume from the second end of the vessel, wherein the arrangement comprises fittings allowing access to the metal hydride of the tubes of the first set of tubes and the second set of tubes.

Such hydrogen storage and release arrangement provides numerous advantages over prior art arrangements for the storage and release of hydrogen, as will be described below.

For example, since the second set of tubes extends into the interior volume from the second end of the vessel, the interior volume of the vessel may be utilized in a more efficient manner since tubes inside the vessel may be arranged closer to each other than in prior art arrangements. The tubes inside the vessel may be arranged closer to each other than in prior art arrangements for the following reasons. There has to be a certain distance between tubes extending into a vessel from one side of the vessel in order to give space for connections and to give space for welding, wrench clearance, maintenance and manufacturing of the vessel. Since tubes extend into the vessel from both the first side and the second side of the vessel, the tubes inside the vessel may be arranged closer to each other than in prior art arrangements.

Since tubes inside the vessel may be arranged closer to each other than in prior art arrangements, storage and release performance of hydrogen may be improved. Also, the hydrogen storage and release arrangement may be more compact for a given throughput of hydrogen than prior art arrangements. Furthermore, a higher proportion of absorbing/desorbing material for a given interior volume of vessel may be provided resulting in a lower proportion of interior volume of vessel filled with heat exchange fluid which needs to be circulated to achieve temperature changes. In addition, a faster change of temperature may reduce the transition time between absorption and desorption by the metal hydride and allow shorter production cycles, thus translating into increased productivity for a given volume of metal hydride. As a result, capital costs on heat exchange equipment may be reduced.

Accordingly, an arrangement is provided where thermal energy, in the form of heat exchange fluid heat, is used efficiently to store and release hydrogen gas.

Also, since the first set of tubes extends into the interior volume from the first end of the vessel and the second set of tubes extends into the interior volume from the second end of the vessel, manufacturing of the arrangement may be facilitated. That is, due to these features, a distance between each tube of the first set of tubes, as well as a distance between each tube of the second set of tubes, may be increased in comparison with an arrangement where tubes extend into a vessel from one side only. Thereby, connections of ducts for supplying and removing hydrogen gas, to and from the metal hydride, may be easier to assemble. Moreover, disassembling, maintenance and service, such as replacement of metal hydride, may be facilitated due to these features. Also, manufacturing of the arrangement may be facilitated and thus also the manufacturing costs may be reduced.

Furthermore, since the arrangement comprises fittings allowing access to the metal hydride of the first set of tubes and the second set of tubes, assembling, disassembling, maintenance and service, such as replacement of metal hydride is facilitated. In addition, according to some embodiments, the arrangement comprises filters arranged between the fittings and the metal hydride of respective tube. Since the arrangement comprises fittings allowing access to the metal hydride of the first set of tubes and the second set of tubes, the fittings will also allow access to the filters. As a result, assembling, disassembling, maintenance, inspection, and replacement of the filters are facilitated.

The expression "dual compartment vessel" is used herein to define a vessel where a first set of tubes extends into the interior volume from the first end of the vessel and a second set of tubes extends into the interior volume from the second end of the vessel.

Since the first set of tubes extends into the interior volume from the first end of the vessel and the second set of tubes extends into the interior volume from the second end of the vessel, the first set of tubes and the second set of tubes may simultaneously be utilized to absorb and desorb hydrogen gas in response to temperature changes caused by the heat exchange fluid. That is, a two-stage compression arrangement using several vessels can be provided by filling the tubes at one end with a metal hydride of lower pressure absorption/desorption characteristics, and at the other end with metal hydride of higher pressure absorption/desorption characteristics such that desorption pressure for the lower pressure metal hydride is higher than the absorption pressure of the higher pressure metal hydride in the range of temperatures selected. Accordingly, the arrangement may be utilized as a hydrogen compressor arrangement. That is, the arrangement may be utilized to increase a pressure level of hydrogen gas from a lower pressure level to a higher pressure level. This will be described in more detail below.

Optionally, the absorption of hydrogen gas constitutes storage of hydrogen gas and the desorption of hydrogen gas constitutes release of hydrogen gas.

Optionally, the second end is opposite to the first end and tubes of the second set of tubes are essentially parallel to the tubes of the first set of tubes. Thereby, the interior volume of the vessel may be used in an even more efficient manner.

Optionally, the tubes of the first set of tubes and tubes of the second set of tubes are interpositioned between each other, within the interior volume, such that each tube of the first set of tubes has a larger number of adjacent tubes from the second set of tubes than from the first set of tubes and such that each tube of the second set of tubes has a larger number of adjacent tubes from the first set of tubes than from the second set of tubes.

Thereby, a larger distance between each tube coming from a given end is enabled, while a higher density of tubes in the vessel interior volume can be obtained. That is, tubes of the first set of tubes and the second set of tubes may be arranged closer to each other in comparison with an arrangement where tubes extends into the vessel of one end of the vessel only, since the tubes each are provided with fittings for ducts for supplying and removing hydrogen gas, which fittings usually have larger diameters than the tubes themselves. Also, such fittings require a wrench clearance which limits a distance between adjacent tubes extending into the vessel from one side. Accordingly, storage and release performance may be improved in comparison with prior art hydrogen storage and release arrangements. Accordingly, an arrangement may be provided efficiently using thermal energy, in the form of heat exchange fluid heat, to store and release hydrogen gas. Furthermore, assembling, disassembling, maintenance and service, such as replacement of metal hydride, may be facilitated as a consequence of these features.

Optionally, the heat exchange fluid transferring means is arranged to selectively transfer heat exchange fluid having at least a lower heat exchange fluid temperature and a higher heat exchange fluid temperature, where the metal hydride of the first set of tubes and the metal hydride of the second set of tubes are arranged to absorb hydrogen gas at a temperature equivalent to the lower heat exchange fluid temperature and arranged to desorb hydrogen gas at a temperature equivalent to the higher heat exchange fluid temperature.

Optionally, the tubes of the first set of tubes each comprises a first metal hydride and tubes of the second set of tubes each comprises a second metal hydride where the second metal hydride has a higher absorption/desorption pressure than the first metal hydride. Thus, by combining first and second compression stage in a single dual compartment vessel, an efficient two-stage compression arrangement can be provided by assembling identical dual compartment vessels. This may make the overall hydrogen compression arrangement design and operation less complex. The two metal hydrides may be selected so that both metal hydrides provide absorption and desorption for the same vessel lower temperature and higher temperature.

Optionally, the arrangement comprises a first vessel and a second vessel where ducts of a first set of tubes of the first vessel are connected to ducts of a second set of tubes of the second vessel, and where hydrogen gas is arranged to be transferred from the first set of tubes of the first vessel to the second set of tubes of the second vessel during, or after, a desorption phase of the hydrogen gas in the first set of tubes of the first vessel. Thereby, an arrangement is provided where an innovative scheme for a semi-continuous two-stage hydrogen storage and release arrangement may be realized with only two "dual compartment vessels while utilising prior art vessels would require a larger number of vessels to achieve a corresponding semi-continuous two-stage hydrogen storage and release scheme. Reducing the number of vessels allows for a more efficient thermal energy utilization than in the case of prior art hydrogen storage and release arrangements.

Optionally, the arrangement further comprises a third vessel and a fourth vessel where ducts of a first set of tubes of the third vessel are connected to ducts of a second set of tubes of the fourth vessel, and where hydrogen gas is arranged to be transferred from the first set of tubes of the third vessel to the second set of tubes of the fourth vessel during, or after, a desorption phase of the hydrogen gas in the first set of tubes of the third vessel. Thereby, an arrangement is provided where an innovative scheme for an uninterrupted two-stage hydrogen storage and release arrangement may be realized with as few as four vessels while based on prior art a minimum of six vessels would be required in order to achieve a corresponding uninterrupted two-stage hydrogen storage and release scheme. Reducing the number of vessels allows for a more efficient thermal energy utilization than in the case of prior art hydrogen storage and release arrangements.

Optionally, the arrangement comprises two or more vessels and where the heat exchange fluid transferring means is arranged to alternately transfer heat exchange fluid having at least a lower heat exchange fluid temperature and a higher heat exchange fluid temperature through interior volumes of the two or more vessels in cycles having an offset to each other. Thereby, an essentially continuous flow of hydrogen gas may be achieved from a hydrogen gas inlet to a hydrogen gas outlet. Accordingly, a continuous compression with uninterrupted hydrogen flow may be achieved.

Optionally, tubes of the first set of tubes and the second set of tubes each comprise heat conductivity increasing means arranged to increase heat conductivity between the heat exchange fluid and the metal hydride. By using heat conductivity increasing means, the performance of the storage and release arrangement may be further improved since the heat transfer from the heat exchange fluid to the metal hydride powder will be more efficient. As a further result, transient response of the arrangement may be improved, i.e., the transition time from a desorption phase to an absorption phase and vice versa may be reduced.

Optionally, the heat conductivity increasing means comprises an insert, such as a copper wire.

Optionally, the ducts of the first set of tubes and the second set of tubes are provided with flow control valves arranged to admit controlling of flow of hydrogen within the ducts.

Optionally, the arrangement is arranged to increase pressure of hydrogen gas from a lower pressure level to a higher pressure level.

A second aspect of the embodiments herein relates to a use of an arrangement according to some embodiments.

A third aspect of the embodiments herein relates to a method for storing and releasing hydrogen using a hydrogen storage and release arrangement comprising a vessel having a first end, a second end and an interior volume, the vessel further comprising a heat exchange fluid inlet and a heat exchange fluid outlet, the arrangement further comprising a first set of tubes extending into the interior volume from the first end of the vessel, where tubes of the first set of tubes each comprises a metal hydride, wherein the arrangement further comprises a second set of tubes extending into the interior volume from the second end of the vessel, where tubes of the second set of tubes each comprises a metal hydride, where the metal hydride of the first set of tubes and the metal hydride of the second set of tubes are arranged to absorb and desorb hydrogen gas in response to temperature changes caused by the heat exchange fluid, and wherein the arrangement comprises ducts for supplying and removing hydrogen gas to and from the metal hydride of the first set of tubes and ducts for supplying and removing hydrogen gas to and from the metal hydride of the second set of tubes, and wherein the arrangement comprises fittings allowing access to the metal hydride of the tubes of the first set of tubes and the second set of tubes, where the method comprises;
  transferring heat exchange fluid through the interior volume of the vessel, using heat exchange fluid transferring means, and
  absorbing and desorbing hydrogen gas in response to temperature changes caused by the heat exchange fluid, using the metal hydride of the first set of tubes and the metal hydride of the second set of tubes.

Since the method uses a hydrogen storage and release arrangement comprising a first set of tubes extending into the interior volume from the first end of the vessel, and a second set of tubes extending into the interior volume from the second end of the vessel, the interior volume of the vessel may be utilized in a more efficient manner. Thereby, storage and release performance of hydrogen may be improved in comparison with prior art hydrogen storage and release methods. Accordingly, a method is provided where the energy input in the form of heat exchange fluid heat, is used efficiently to store and release hydrogen gas.

Also, since the first set of tubes extends into the interior volume from the first end of the vessel and the second set of tubes extends into the interior volume from the second end of the vessel, the first set of tubes and the second set of tubes may simultaneously be utilized to absorb or desorb hydrogen gas in response to temperature changes caused by the heat exchange fluid. This further allows for an efficient interconnection of the first and the second set of tubes of two or more vessels, as explained in more detail below. The arrangement may be utilized as a hydrogen compressor arrangement. That is, the arrangement may be utilized to increase pressure of hydrogen gas from a lower pressure level to a higher pressure level.

Optionally, the method further comprises;
  selectively transferring heat exchange fluid having at least a lower heat exchange fluid temperature and a higher heat exchange fluid temperature, using the heat exchange fluid transferring means,
  absorbing hydrogen gas at a temperature equivalent to the lower heat exchange fluid temperature, and
  desorbing hydrogen gas at a temperature equivalent to the higher heat exchange fluid temperature, using the metal hydride of the first set of tubes and the metal hydride of the second set of tubes.

Optionally, the arrangement comprises a first vessel and a second vessel where ducts of a first set of tubes of the first vessel are connected to ducts of a second set of tubes of the second vessel, and where the method comprises;
  transferring hydrogen gas from the first set of tubes of the first vessel to the second set of tubes of the second vessel during, or after, a desorbing of the hydrogen gas in the first set of tubes of the first vessel.

Optionally, the arrangement further comprises a third vessel and a fourth vessel where ducts of a first set of tubes of the third vessel are connected to ducts of a second set of tubes of the fourth vessel, and where the method further comprises;
  transferring hydrogen from the first set of tubes of the third vessel to the second set of tubes of the fourth vessel during, or after, a desorbing of the hydrogen gas in the first set of tubes of the third vessel.

Optionally, the arrangement comprises two or more vessels and where the method further comprises;
  alternately transferring heat exchange fluid having at least a lower heat exchange fluid temperature and a higher heat exchange fluid temperature through interior volumes of the two or more vessels in cycles having an offset to each other, using the heat exchange fluid transferring means.

In this manner, an essentially continuous flow of hydrogen gas may be achieved from a hydrogen gas inlet to a hydrogen gas outlet.

Further features of, and advantages with, the embodiments herein will become apparent when studying the appended claims and the following detailed description. Those skilled in the art will realize that the different features described may be combined to create embodiments other than those described in the following, without departing from the scope of the embodiments herein, as defined by the appended claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

Embodiments herein will now be described more fully with reference to the accompanying drawings, in which example embodiments are shown. Disclosed features of example embodiments may be combined. Like numbers refer to like elements throughout.

Well-known functions or constructions will not necessarily be described in detail for brevity and/or clarity.

Figure 1:
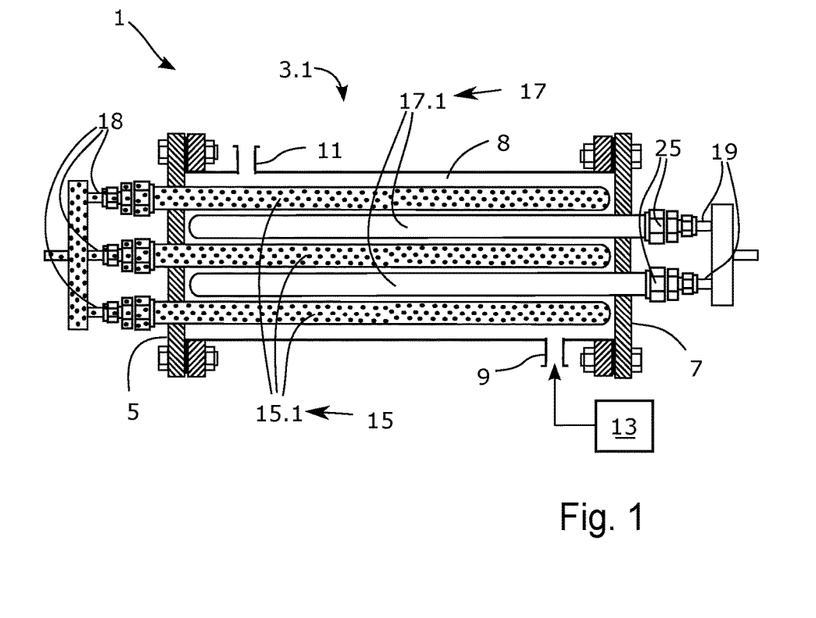
FIG. 1 illustrates an exemplifying hydrogen storage and release arrangement.

FIG. 1 illustrates an exemplifying hydrogen storage and release arrangement 1. The arrangement 1 comprises a vessel 3.1 having a first end 5, a second end 7 and an interior volume 8. The vessel 3.1 further comprises a heat exchange fluid inlet 9 and a heat exchange fluid outlet 11 by which heat exchange fluid is arranged to be transferred, by heat exchange fluid transferring means 13, through the interior volume 8 of the vessel 3.1. The heat exchange fluid transferring means 13 may comprise a heat source such as residual heat source from a factory or similar, and a pump unit arranged to transfer the heat exchange fluid through the interior volume 8 of the vessel 3.1. The arrangement 1 further comprises a first set of tubes 15 extending into the interior volume 8 from the first end 5 of the vessel 3.1. Tubes 15.1 of the first set of tubes 15 each comprises a metal hydride 16.1 and ducts 18 for supplying and removing hydrogen gas to and from the metal hydride 16.1. The arrangement further comprises a second set of tubes 17. Tubes 17.1 of the second set of tubes 17 each comprises a metal hydride 16.2 and ducts 19 for supplying and removing hydrogen gas to and from the metal hydride 16.2. The metal hydride 16.1 of the first set of tubes 15 and the metal hydride 16.2 of the second set of tubes 17 are arranged to absorb and desorb hydrogen gas in response to temperature changes caused by the heat exchange fluid. As illustrated in FIG. 1, the second set of tubes 17 extends into the interior volume 8 from the second end 7 of the vessel 3.1. In this manner, several advantages are achieved with the arrangement provided in comparison with prior art hydrogen storage and release arrangements as explained above, and which will be further explained below.

Tubes 15.1, 17.1 of the first and the second set of tubes 15, 17 may be seamless and made of stainless steel, aluminum or special alloy steel.

Tubes 15.1, 17.1 of the first and the second set of tubes 15, 17 may be filled with the metal hydrides 16.1, 16.2 through an open end. The metal hydride 16.1 of the first set of tubes 15 and the metal hydride 16.2 of the second set of tubes 17 may be in particulate form and may be a metal or metal alloy capable of absorbing hydrogen gas at a given temperature and pressure and releasing hydrogen gas when the temperature is increased. The material is not limited to a specific type and any suitable hydride-forming material may be selected for this purpose. Preferably, the metal hydride material is an alloy comprising at least one component selected from the group consisting of hydride forming metals, such as titanium, zirconium, vanadium, calcium, magnesium and rare earth elements. A hydride forming material may be selected from AB, AB2, AB3, A2B7 or AB5 types of intermetallic alloy, where A is hydride forming metal or their combination.

The alloys may be:
AB5 type alloy, where A is rare-earth metals or calcium or their combination, and B is nickel or nickel in combination with other metal selected form the group consisting of iron, cobalt, manganese, aluminium, copper, tin. A typical example is LaNi5.
AB2 type alloy, where A is titanium, zirconium or their combination, and B is a component or combination of components selected form the group consisting of chromium, manganese, vanadium, iron, cobalt, nickel, copper. A typical example is TiCr2, TiCrMn.
AB type alloy, where A is titanium, zirconium or their combination, and B is a component or combination of components selected form the group consisting of chromium, manganese, vanadium, iron, cobalt, nickel. A typical example is TiFe.

A filter (not shown) may be placed at the open end of the tube to allow gas to flow but prevent solid particles from escaping the tube sets 15, 17. The filter may be of cylindrical or disc configuration and made of porous material inert to hydrogen (e.g., metal, glass, ceramics, fabrics etc.).

The metal hydride 16.1 of the first set of tubes 15 and the metal hydride 16.2 of the second set of tubes 17 may be of similar type or may be of different type, regarding chemical composition and/or absorbing and desorbing capabilities.

The absorption of hydrogen gas may constitute a storage of hydrogen gas and the desorption may constitute a release of hydrogen gas.

As illustrated in FIG. 1, the second end 7 of the vessel 3.1 is opposite to the first end 5 of the vessel 3.1 and tubes 17.1 of the second set of tubes 17 are essentially parallel to the tubes 15.1 of the first set of tubes 15.

In FIG. 1 the tubes 15.1 of the first set of tubes 15 are illustrated with dots. The sole purpose of these dots is to facilitate discernment of tubes 15.1 of the first set of tubes 15 from tubes 17.1 of the second set of tubes 17.

Figure 2:
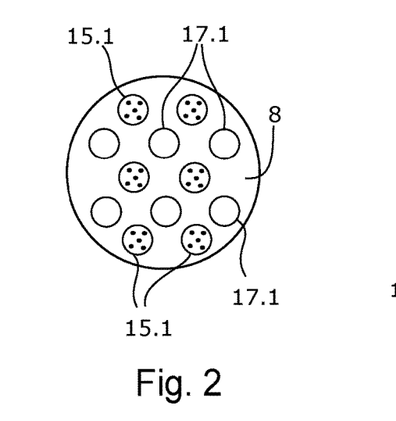
FIG. 2 illustrates an exemplifying cross section of a vessel illustrated in FIG. 1.

FIG. 2 illustrates an exemplifying cross section of the vessel 3.1 illustrated in FIG. 1. As illustrated, the tubes 15.1 of the first set of tubes 15 and tubes 17.1 of the second set of tubes 17 are interpositioned between each other, within the interior volume 8, such that each tube 15.1 of the first set of tubes 15 has a larger number of adjacent tubes 17.1 from the second set of tubes 17 than from the first set of tubes 15. Likewise, each tube 17.1 of the second set of tubes 17 has a larger number of adjacent tubes 15.1 from the first set of tubes 15 than from the second set of tubes 17. In this manner, tubes 15.1, 17.1 of the first set of tubes 15 and the second set of tubes 17 may be arranged closer to each other in comparison with an arrangement where tubes extends into the vessel from one end of the vessel only. One reason for this is that each tube 15.1, 17.1 is provided with a fitting 25 connecting respective ducts 18, 19 to respective tube 15.1, 17.1. A diameter of such fittings 25 is generally larger than a diameter of the tubes 15.1, 17.1 and at least, there has to be a minimum wrench clearance. The fittings 25 are arranged external to the interior volume 8 in order to avoid potential leakage points inside the hard-to-reach vessel. Hence, tube layout should be arranged in such a way that the manifold is easily assembled/disassembled to/from the tube bundle. The arrangement may comprise a first manifold for connecting two or more tubes of the first set of tubes and a second manifold for connecting two or more tubes of the second set of tubes. The first and second manifold may each comprise a fitting for connection to a respective duct where the manifolds are arranged to supply and remove hydrogen gas to and from the metal hydride of the respective tubes. Thereby, the number of fittings can be reduced which thus may reduce the risk of leakage and which may facilitate manufacturing, assembly and disassembly of the arrangement. The manifolds may comprise screw caps facing respective tubes of the first set of tubes and the second set of tubes to allow access to the metal hydride of the tubes. In addition, the fitting for connection to a respective duct may allow access to the metal hydride of one of the respective tubes of the first set of tubes and the second set of tubes and wherein screw caps are provided in the manifolds facing the other tubes for allowing access to the metal hydride of the other tubes. The first and second manifold may each comprise a fitting for connection to a respective duct and fittings for connection to tubes of the first set of tubes and the second set of tubes.

Figure 3:
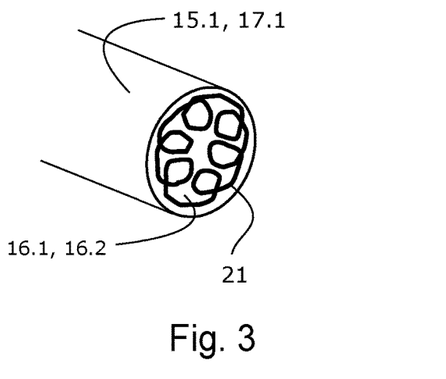
FIG. 3 illustrates an exemplifying cross section of a tube illustrated in FIG. 2.

Thanks to these features, loading and unloading of metal hydride is facilitated. FIG. 3 illustrates an exemplifying cross section of a tube 15.1, 17.1. The tube 15.1, 17.1 comprises a metal hydride 16.1, 16.2. The tube 15.1, 17.1 illustrated in FIG. 3 further comprises a heat conductivity increasing means 21 arranged to increase heat conductivity between the heat exchange fluid and the metal hydride 16.1, 16.2. Such heat conductivity increasing means 21 may comprise an insert, such as a copper wire. The heat conductivity increasing means 21 is preferably thermally coupled with an internal tube surface. Furthermore, the heat conductivity increasing means 21 is inert to hydrogen and allow easy filling of metal hydride into reactor tube. The heat conductivity increasing means 21 may comprise a wire matrix or a metal foam where the matrix and/or metal foam may be made of copper, aluminium or stainless steel. Other heat transfer improving techniques such as pelletisation/compacting and filler elements may be used as well.

A preferred embodiment of the heat conductivity increasing means 21 may be a copper wire petal insert, which has good thermal conductivity, provides a good thermal coupling with tube walls, has large void space, is easy to insert and remove from a tube and can be provided at a low cost. Such copper wire petal insert is further described in the document EP 0061154 A2. By using a heat conductivity increasing means 21, storage and release performance of the arrangement 1 may be further improved since the thermal energy from the heat exchange fluid will be more efficiently transferred to the metal hydride 16.1, 16.2. As a further result, transient response of the arrangement 1 may be improved, i.e. the transition time from desorption phase to absorption phase and vice versa may be reduced.

As previously indicated, the features that the first set of tubes 15 extends into the interior volume 8 from the first end 5 of the vessel 3.1 and the second set of tubes 17 extends into the interior volume 8 from the second end 7 of the vessel 3.1, allows for more compact vessel configuration than if all tubes and consequent fittings were located at the same side of the vessel. In the example shown in FIG. 2, six tubes are inserted into the vessel from one side. This allows appropriate clearance between tubes (tube pitch) required for their welding to the tube-sheet (flange) and connection to the manifold. As an alternative to welding, or in addition to welding, the tubes may be attached to the tube-sheet (flange) using o-ring based joints, sleeve joints or similar. Thereby, the tubes may be attached to the tube-sheet (flange) in a simple manner. Placing of another six tubes from the other side of the vessel 3.1 allows to utilize interior volume 8 of the vessel 3.1 more efficiently, i.e., a higher payload efficiency is achieved. Furthermore, a higher metal hydride-material-volume to total-shell-volume ratio is obtained which leads to a higher hydrogen storage capacity within the same vessel dimension. In addition, the space between tubes is minimised reducing the volume of "trapped" heat exchange fluid when switching from heating to cooling and back which increases thermal efficiency and shortens the production cycle. Thus, a single vessel can hold two metal hydride compartments—the dual compartment vessel. Thus, splitting the payload inside the same vessel into two separate compartments allows for a realization of an innovative scheme of continuous two-stage thermal hydrogen metal hydride compressor, as explained further below.

According to some embodiments, the heat exchange fluid transferring means 13 is arranged to selectively transfer heat exchange fluid having at least a lower heat exchange fluid temperature $T_L$ and a higher heat exchange fluid temperature $T_H$, where the metal hydride 16.1 of the first set of tubes 15 and the metal hydride 16.2 of the second set of tubes 17 are arranged to absorb hydrogen gas at a temperature equivalent to the lower heat exchange fluid temperature $T_L$ and arranged to desorb hydrogen gas at a temperature equivalent to the higher heat exchange fluid temperature $T_H$.

According to some embodiments, the tubes 15.1 of the first set of tubes 15 each comprises a first metal hydride 16.1 and tubes 17.1 of the second set of tubes 17 each comprises a second metal hydride 16.2 where the second metal hydride 16.2 has a higher absorption/desorption pressure than the first metal hydride 16.1. Loading the tubes 15.1, 15.2 with different metal hydride material makes it possible to combine different stages such that these form a multistage compressor in a single vessel, for example a first and a second stage of a two-stage compressor, as explained further below.

Figure 4:
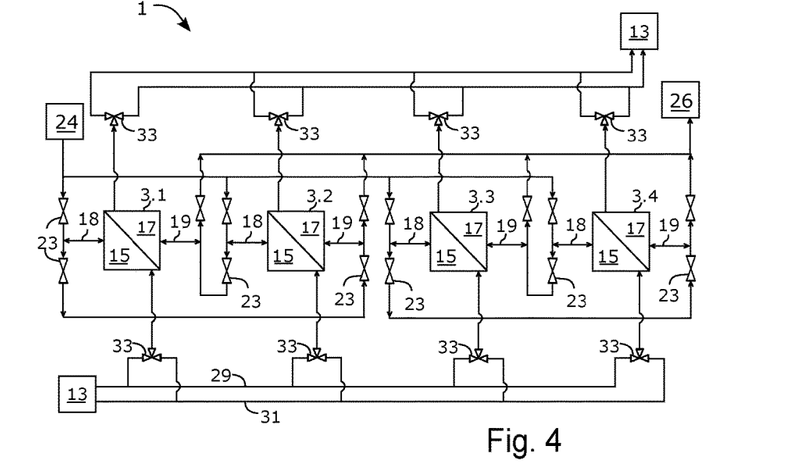
FIG. 4 schematically illustrates an exemplifying hydrogen storage and release arrangement comprising four vessels.

FIG. 4 schematically illustrates an exemplifying embodiment of a hydrogen storage and release arrangement 1 comprising four vessels 3.1-3.4. In this example, an arrangement 1 comprising four vessels 3.1-3.4 is explained. However, according to other embodiments, the arrangement 1 may comprise another number of vessels than four. Such number may for example be three, five, six, seven or eight vessels.

As illustrated in FIG. 4, the arrangement 1 comprises a first vessel 3.1 and a second vessel 3.2 where ducts 18 of a first set of tubes 15 of the first vessel 3.1 are connected to ducts 19 of a second set of tubes 17 of the second vessel 3.2.

Hydrogen gas is arranged to be transferred from the first set of tubes 15 of the first vessel 3.1 to the second set of tubes 17 of the second vessel 3.2 during, or after, a desorption phase of the hydrogen gas in the first set of tubes 15 of the first vessel 3.1. Likewise, in these embodiments, ducts 18 of a first set of tubes 15 of the second vessel 3.2 are connected to ducts 19 of a second set of tubes 17 of the first vessel 3.1. Hydrogen gas is arranged to be transferred from the first set of tubes 15 of the second vessel 3.2 to the second set of tubes 17 of the first vessel 3.1 during, or after, a desorption phase of the hydrogen gas in the first set of tubes 15 of the second vessel 3.2.

As illustrated in FIG. 4, the arrangement 1 further comprises a third vessel 3.3 and a fourth vessel 3.4 where ducts 18 of a first set of tubes 15 of the third vessel 3.3 are connected to ducts 19 of a second set of tubes 17 of the fourth vessel 3.4. Hydrogen gas is arranged to be transferred from the first set of tubes 15 of the third vessel 3.3 to the second set of tubes 17 of the fourth vessel 3.4 during, or after, a desorption phase of the hydrogen gas in the first set of tubes 15 of the third vessel 3.2. Likewise, in these embodiments, ducts 18 of a first set of tubes 15 of the fourth vessel 3.4 are connected to ducts 19 of a second set of tubes 17 of the third vessel 3.3. Hydrogen gas is arranged to be transferred from the first set of tubes 15 of the fourth vessel 3.4 to the second set of tubes 17 of the third vessel 3.3 during, or after, a desorption phase of the hydrogen gas in the first set of tubes 15 of the fourth vessel 3.4.

Figure 5:
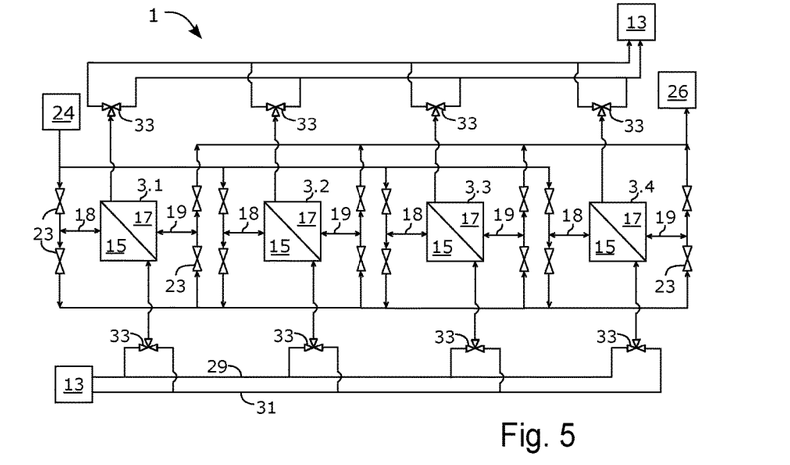
FIG. 5 schematically illustrates a further exemplifying hydrogen storage and release arrangement comprising four vessels.

FIG. 5 schematically illustrates a further exemplifying hydrogen storage and release arrangement 1 comprising four vessels 3.1-3.4. In this example, an arrangement 1 comprising four vessels 3.1-3.4 is explained. However, according to other embodiments, the arrangement 1 may comprise another number of vessels than four. Such number may for example be three, five, six, seven or eight vessels.

As illustrated in FIG. 5, the ducts 18 of the first set of tubes 15 are connected to ducts 19 of a second set of tubes 17 of another vessel 3.2-3.4. In the embodiment shown, hydrogen gas is arranged to be transferred from the first set of tubes 15 of a vessel 3.1-3.4 to the second set of tubes 17 of another vessel 3.1-3.4 during, or after, a desorption phase of the hydrogen gas in the first set of tubes 15. The ducts 18, 19 of the first set of tubes 15 and the second set of tubes 17 are provided with flow control valves 23 arranged to control admission of hydrogen in the ducts 18, 19. In FIG. 5, as well as in FIG. 4, only some of the flow control valves 23 have been provided with a reference sign. This is only due to clarity reasons and every valve-symbol in FIG. 5, as well as in FIG. 4, is intended to show a flow control valve 23. The arrangement 1 may comprise a control unit and actuators (not shown) arranged to control respective flow control valve 23 between an open position and a closed position. As an alternative, or in combination, each flow control valve 23 may be arranged to open at a certain hydrogen gas pressure and may be equivalent to a so-called one-way valve/check valve. Such flow control valves 23 may comprise a spring loaded ball valve. The operation of an arrangement using one-way valves is further explained below.

In embodiments described in FIG. 5, the flow control valves 23 may be arranged to control flow of hydrogen gas such that hydrogen gas is transferred from the first set of tubes 15 of a first vessel 3.1 to the second set of tubes 17 of a second vessel 3.2 during, or after, a desorption phase of the hydrogen gas in the first set of tubes 15 of the first vessel 3.1. Likewise, in such embodiments, the flow control valves 23 may be arranged to control flow of hydrogen gas such that hydrogen gas is transferred from the first set of tubes 15 of the second vessel 3.2 to the second set of tubes 17 of a first vessel 3.1 during, or after, a desorption phase of the hydrogen gas in the first set of tubes 15 of the second vessel 3.1. Likewise, in such embodiments, the flow control valves 23 may be arranged to control flow of hydrogen gas such that hydrogen gas is transferred from the first set of tubes 15 of a third vessel 3.3 to the second set of tubes 17 of a fourth vessel 3.4 during, or after, a desorption phase of the hydrogen gas in the first set of tubes 15 of the third vessel 3.3. Likewise, in such embodiments, the flow control valves 23 may be arranged to control flow of hydrogen gas such that hydrogen gas is transferred from the first set of tubes 15 of the fourth vessel 3.4 to the second set of tubes 17 of the third vessel 3.3 during, or after, a desorption phase of the hydrogen gas in the first set of tubes 15 of the fourth vessel 3.4. In this manner, an essentially continuous flow of hydrogen gas may be achieved from the hydrogen gas inlet 24 to the hydrogen gas outlet 26 and the interior volume of each vessel 3.1-3.4 may be utilized in an efficient manner.

The arrangement 1 in FIG. 5 may provide extended operational flexibility and redundancy, as the hydrogen provided to the arrangement may be distributed to any first set of tubes 15 of any vessel 3.1-3.4 due to the ducts 18 and control of valves 23. In addition, hydrogen desorbed from any first set of tubes 15 of any vessel 3.1-3.4 may flow through a common piping before being distributed to any second set of tubes 17 of any vessel 3.1-3.4 due to ducts 18, 19.

In the embodiments shown in FIG. 5, leakage or maintenance in any vessel 3.1-3.4 or set of tubes 15 or 17 of a vessel 3.1-3.4 will probably affect general performance of the arrangement 1, but it will not necessarily stop it. Another advantage with the embodiments shown in FIG. 5 is that in the case where a set of tubes 17 in vessel 3.2 is taken out of operation, e.g., for metal hydride replacement, the hydrogen produced after first stage compression can be distributed between set of tubes 17 of the other vessels 3.1, 3.3 and 3.4. Thus, the arrangement 1 described in FIG. 5 may provide advantages in terms of operational robustness.

In both the embodiments described above, FIG. 4 and FIG. 5, the control valves 23 may be check valves.

The arrangement 1 illustrated in FIG. 4, as well as the arrangement 1 illustrated in FIG. 5, comprises a heat exchange fluid transferring means 13 arranged to alternately transfer heat exchange fluid having at least a lower heat exchange fluid temperature $T_L$ and a higher heat exchange fluid temperature $T_H$ through interior volumes 8 of the two or more vessels 3.1-3.4 in cycles having an offset to each other. As illustrated in FIG. 4 and FIG. 5, this may be achieved by the heat exchange fluid transferring means 13 comprising a low temperature heat exchange fluid duct 29 and a high temperature heat exchange fluid duct 31 and three way valves 33 allowing the alternately transfer of the heat exchange fluid having at least a lower heat exchange fluid temperature $T_L$ and a higher heat exchange fluid temperature $T_H$ through interior volumes 8 of the two or more vessels 3.1-3.4 in cycles having an offset to each other. The arrangement 1 may further comprise a control unit and actuators (not shown) arranged to control respective three way valve 33 in order to achieve such alternating heat transfer. As an example, the lower heat exchange fluid temperature $T_L$ may be 20-30° C. and higher heat exchange fluid temperature $T_H$ may be 80-90° C.

Below, if nothing else is stated, reference is made to the arrangement 1 shown in FIG. 4 as well as the arrangement 1 shown in FIG. 5. The arrangement 1 comprises a hydrogen gas inlet 24 and a hydrogen gas outlet 26. The hydrogen gas inlet 24 is in communication with the ducts 18 of the first set of tubes 15 of each vessel 3.1-3.4. The hydrogen gas outlet 26 is in communication with the ducts 19 of the second set of tubes 17 of each vessel 3.1-3.4. Accordingly, in the embodiment shown, the first set of tubes 15 of each vessel 3.1-3.4 is arranged to be supplied with hydrogen gas from the hydrogen gas inlet 24. The second set of tubes 17 of each vessel 3.1-3.4 is arranged to release hydrogen to the hydrogen gas outlet 26. In this manner, pressure of the hydrogen gas may be increased from a lower pressure level at the hydrogen gas inlet 24 to a higher pressure level at the hydrogen gas outlet 26. Thus, the hydrogen storage and release arrangement 1 may be used to increase pressure of hydrogen gas from a lower pressure level to a higher pressure level. Thus, according to some embodiments, the arrangement 1 may be called a hydrogen compressor arrangement.

Multistage hydrogen compression allows achieving high compression ratio. A one-stage metal hydride compressor operating at a temperature difference of 60-70° C., e.g., using a heat exchange fluid temperature $T_L$ of 20-30° C. for cooling and a higher heat exchange fluid temperature $T_H$ of 80-90° C. for heating, typically provides compression ratio of approximately three. For example, a compression ratio of three is equivalent to a pressure increase from 10 bar at the inlet 24 to 30 bar at the outlet 26 of the arrangement.

Now, with the same operating temperatures, i.e., using a heat exchange fluid temperature $T_L$ of 20-30° C. for cooling and a higher heat exchange fluid temperature $T_H$ of 80-90° C. for heating, a two-stage compressor can allow for another threefold increase in the hydrogen output pressure. That is, in the example above, a two-stage compressor would achieve a pressure increase from 10 bar at the inlet 24 to 90 bar at the outlet 26. Such a two-stage compressor uses two metal hydrides with different absorption/desorption pressures.

Throughout, the expression "dual compartment vessel" refers to a vessel where a first set of tubes extends into an interior volume of the vessel from a first end of the vessel and a second set of tubes extends into the interior volume from a second end of the vessel. Also, the word "compressor" refers to a hydrogen storage and release arrangement, according to some embodiments.

As specified above, the vessels 3.1-3.4 shown in FIG. 4 and FIG. 5 may be cooled and heated in alternating manner. When one vessel 3.1-3.4 is cooled, metal hydride in a tube of such a vessel 3.1-3.4 will absorb hydrogen. When another vessel 3.1-3.4 is heated metal hydride in a tube of such a vessel 3.1-3.4 will deliver compressed hydrogen. In this way heat is continuously supplied to/extracted from the vessels 3.1-3.4. During hot/cold swapping, some period of time is required in order to reach the temperatures at which equilibrium hydrogen desorption pressure in heated metal hydride vessel becomes higher than the delivery pressure and for the equilibrium hydrogen absorption pressure in cooled metal hydride vessel to drop below the input pressure. As a result, in general flow of hydrogen is interrupted both at the input and the output during such hot/cold swapping. In order to eliminate the impact of this transition time effect, an offset in the cycle program of the arrangement is provided.

An arrangement comprising two vessels may provide two-stage compression with semi-continuous hydrogen output flow. An arrangement 1 comprising four vessels 3.1-3.4 provides for true uninterrupted/continuous hydrogen flow. The arrangement 1 may be operated by time control of cooling and heating duration, switching between cold fluid circuit 29 and hot fluid circuit 31 after a set period of time, the so-called half cycle time, in such a way that the compression cycle, alternating cooling/heating of one pair of vessels, is shifted in time relatively to the other pair of vessels, e.g., by quarter of a cycle, the offset. Thus, at one moment two vessels may receive hydrogen while another two vessels may release compressed hydrogen.

A two-stage hydrogen compressor can be provided by combining dual compartment vessels described herein, where a first stage is formed by a first set of tubes filled with a metal hydride having a lower hydrogen absorption/desorption pressure. Such metal hydride will herein be called "first stage metal hydride". A second stage is further formed by a second set of tubes filled with a metal hydride having a higher absorption/desorption pressure at the same operating temperatures. Such metal hydride will herein be called "second stage metal hydride". Now, the equilibrium absorption pressure of the second stage metal hydride at low operation temperature is lower than the equilibrium desorption pressure of first stage metal hydride at high operation temperature.

In all compressor configurations described herein, the dual compartment vessel can be utilized in a way were first set of tubes and second set of tubes of each vessel is provided with the same type of metal hydride, typically for a one-stage compression. However, below the advantages of using different metal hydrides in a single vessel is described, i.e., two-stage compression.

In the case when single compartment vessels are used, i.e., vessels where tubes extend into an interior volume of the vessel from only one end of the vessel, as described in the prior art, a minimum of six vessels are needed for a similar uninterrupted/continuous two-stage hydrogen compression, where first three vessels comprise first stage metal hydride and the other three vessels comprise second stage metal hydride. Heating/cooling operations for different vessels in this example should be shifted by ⅓ of half cycle time in order to achieve similar uninterrupted/continuous two-stage hydrogen compression.

Thus, for a continuous/uninterrupted two-stage compressor, use of the dual compartment vessel configuration allows to reduce the number of vessels needed from six to four.

Below, an embodiment of a two-stage compressor is described, reference being made to the arrangement 1 shown in FIG. 4 as well as the arrangement shown in FIG. 5. Depending on the metal hydride material in the tube sets 15 and 17, the hydrogen storage and release arrangement 1 can be a one-stage or two-stage compressor. Here, two-stage hydrogen compression will be explained in further detail.

As specified above, the vessels 3.1-3.4 shown in FIG. 4 and FIG. 5 may be cooled and heated in alternating manner. When one vessel 3.1-3.4 is cooled, metal hydride in a tube of such a vessel 3.1-3.4 will absorb hydrogen. When another vessel 3.1-3.4 is heated, metal hydride in a tube of such a vessel 3.1-3.4 will desorb hydrogen. In this way heat is continuously supplied to/extracted from the vessels 3.1-3.4 and hydrogen may be delivered to the hydrogen gas outlet 26 of the arrangement 1 at a higher pressure than at the hydrogen gas inlet 24 of the arrangement 1.

For simplicity, 3-way valves 33 are illustrated in FIG. 4 and FIG. 5. Such 3-way valves 33 may be controlled such that each vessel 3.1-3.4 is supplied with heat exchange fluid having a higher heat exchange fluid temperature $T_H$ and heat exchange fluid having a lower heat exchange fluid temperature $T_L$. Operation of the arrangements 1 illustrated in FIG. 4 and FIG. 5 may be organised in such a way that at the same time two vessels are being cooled in absorption mode and two other vessels are being heated in desorption mode. However, the compression cycle for one pair of vessels may be shifted in time in relation to the compression cycle of the other pair. By overlapping compression cycles of the two pairs of vessels an uninterrupted delivery of compressed hydrogen may be obtained. The operation can be divided in four sequential time steps as illustrated in Table 1, below.

|        |    | Time step |     |     |     |     |     |     |     |
|--------|----|-----------|-----|-----|-----|-----|-----|-----|-----|
| Vessel |    | 1         | 2   | 3   | 4   | 1   | 2   | 3   | 4   |
| 3.1    | 15 | Abs       |     | Des |     | Abs |     |     | Abs |
|        | 17 | Abs       |     | Des |     | Abs |     |     | Abs |
| 3.2    | 15 | Des       |     | Abs |     | Des |     |     | Abs |
|        | 17 | Des       |     | Abs |     | Des |     |     | Abs |
| 3.3    | 15 | Abs       | Des |     |     | Abs | Des |     | Abs |
|        | 17 | Abs       | Des |     |     | Abs | Des |     | Abs |
| 3.4    | 15 | Des       | Abs |     |     | Des | Abs |     | Des |
|        | 17 | Des       | Abs |     |     | Des | Abs |     | Des |

Table 1 illustrates an example sequence diagram for an arrangement 1 comprising four vessels 3.1-3.4. As seen, the sequence diagram repeats itself after the four time slots. Below, reference is made to the sequence diagram illustrated in Table 1, performed on a hydrogen storage and release arrangement 1 illustrated in FIG. 4 or FIG. 5. Such arrangement 1 may be operated as follows:

Time Step 1:
Controlling valves 33 such that heat exchange fluid having the lower heat exchange fluid temperature $T_L$ is transferred through the interior volume of the first vessel 3.1 to initiate an absorption-phase of hydrogen in first and second sets of tubes 15, 17 of the first vessel 3.1.
Controlling valves 33 such that heat exchange fluid having the higher heat exchange fluid temperature $T_H$ is transferred through the interior volume of the second vessel 3.2 to initiate a desorption-phase of hydrogen in first and second sets of tubes 15, 17 of the second vessel 3.2.

In time step 1, valves 33 will be remained in position such that:
heat exchange fluid having the lower heat exchange fluid temperature $T_L$ is transferred through the interior volume of the third vessel 3.3 to continue an absorption-phase of hydrogen, initiated in a preceding time step, in first and second sets of tubes 15, 17 of the third vessel 3.3, and
heat exchange fluid having the higher heat exchange fluid temperature $T_H$ is transferred through the interior volume of the fourth vessel 3.4 to continue an desorption-phase of hydrogen, initiated in a preceding time step, of hydrogen in first and second sets of tubes 15, 17 of the fourth vessel 3.4.

Time Step 2:
In time step 2, valves 33 will be remained in a position such that:
heat exchange fluid having the lower heat exchange fluid temperature $T_L$ is transferred through the interior volume of the first vessel 3.1 to continue the absorption-phase of hydrogen, initiated in a time step 1, in first and second sets of tubes 15, 17 of the first vessel 3.1, and
heat exchange fluid having the higher heat exchange fluid temperature $T_H$ is transferred through the interior volume of the second vessel 3.2 to continue the desorption-phase, initiated in time step 1, of hydrogen in first and second sets of tubes 15, 17 of the second vessel 3.2, and
controlling valves 33 such that heat exchange fluid having the higher heat exchange fluid temperature $T_H$ is transferred through the interior volume of the third vessel 3.3 to initiate a desorption-phase of hydrogen in first and second sets of tubes 15, 17 of the third vessel 3.3.
controlling valves 33 such that heat exchange fluid having the lower heat exchange fluid temperature $T_L$ is transferred through the interior volume of the fourth vessel 3.4 to initiate an absorption-phase of hydrogen in first and second sets of tubes 15, 17 of the fourth vessel 3.4.

Time Step 3:
controlling valves 33 such that heat exchange fluid having the higher heat exchange fluid temperature $T_H$ is transferred through the interior volume of the first vessel 3.1 to initiate a desorption-phase of hydrogen in first and second sets of tubes 15, 17 of the first vessel 3.1.
controlling valves 33 such that heat exchange fluid having the lower heat exchange fluid temperature $T_L$ is transferred through the interior volume of the second vessel 3.2 to initiate an absorption-phase of hydrogen in first and second sets of tubes 15, 17 of the second vessel 3.2.

In time step 3, valves 33 will be remained in a position such that
heat exchange fluid having the higher heat exchange fluid temperature $T_H$ is transferred through the interior volume of the third vessel 3.3 to continue the desorption-phase, initiated in time step 2, of hydrogen in first and second sets of tubes 15, 17 of the third vessel 3.3, and
heat exchange fluid having the lower heat exchange fluid temperature $T_L$ is transferred through the interior volume of the fourth vessel 3.4 to continue the absorption-phase of hydrogen, initiated in a time step 2, in first and second sets of tubes 15, 17 of the fourth vessel 3.4.

Time Step 4:
In time step 4, valves 33 will be remained in a position such that
heat exchange fluid having the higher heat exchange fluid temperature $T_H$ is transferred through the interior volume of the first vessel 3.1 to continue the desorption-phase, initiated in time step 3, of hydrogen in first and second sets of tubes 15, 17 of the first vessel 3.1, and
heat exchange fluid having the lower heat exchange fluid temperature $T_L$ is transferred through the interior volume of the second vessel 3.2 to continue the absorption-phase of hydrogen, initiated in a time step 3, in first and second sets of tubes 15, 17 of the second vessel 3.2, and
controlling valves 33 such that heat exchange fluid having the lower heat exchange fluid temperature $T_L$ is transferred through the interior volume of the third vessel 3.3 to initiate an absorption-phase of hydrogen in first and second sets of tubes 15, 17 of the third vessel 3.3.
controlling valves 33 such that heat exchange fluid having the higher heat exchange fluid temperature $T_H$ is transferred through the interior volume of the fourth vessel 3.4 to initiate a desorption-phase of hydrogen in first and second sets of tubes 15, 17 of the fourth vessel 3.4.

As seen in Table 1, after time step 4, the sequence diagram will be continued at time step 1. In this manner, a continuous flow of hydrogen can be achieved from the hydrogen gas inlet 24 to the hydrogen gas outlet 26 of the arrangement 1, which will be further explained below.

During Time Steps 1 and 2:
Low pressure hydrogen, from the hydrogen gas inlet 24 of the arrangement 1, is absorbed by a first stage metal hydride in the first set of tubes 15 of the first vessel 3.1, and medium pressure hydrogen is desorbed from the first stage metal hydride in the first set of tubes 15 of the second vessel 3.2, and medium pressure hydrogen, from the first set of tubes 15 of the second vessel 3.2, is transferred, via a control valve such as a one-way valve, to the second set of tubes 17 of the first vessel 3.1 where the hydrogen is absorbed by a second stage metal hydride, and high pressure hydrogen is desorbed from the second stage metal hydride in the second set of tubes 17 of the second vessel 3.2 and transferred, through a control valve such as a one-way valve, to the hydrogen gas outlet 26 of the arrangement 1.

During Steps 2 and 3:
Low pressure hydrogen, from the hydrogen gas inlet 24 of the arrangement 1, is absorbed by a first stage metal hydride in the first set of tubes 15 of the fourth vessel 3.4, and medium pressure hydrogen is desorbed from the first stage metal hydride in the first set of tubes 15 of the third vessel 3.3, and medium pressure hydrogen, from the first set of tubes 15 of the third vessel 3.3, is transferred, via a control valve such as a one-way valve, to the second set of tubes 17 of the fourth vessel 3.4 where the hydrogen is absorbed by the second stage metal hydride, and high pressure hydrogen is desorbed from the second stage metal hydride in the second set of tubes 17 of the third vessel 3.3 and transferred, through a control valve such as a one-way valve, to the hydrogen gas outlet 26 of the arrangement 1.

During Steps 3 and 4:
Low pressure hydrogen, from the hydrogen gas inlet 24 of the arrangement 1, is absorbed by the first stage metal hydride in the first set of tubes 15 of the second vessel 3.2, and medium pressure hydrogen is desorbed from the first stage metal hydride in the first set of tubes 15 of the first vessel 3.1, and medium pressure hydrogen, from the first set of tubes 15 of the first vessel 3.1, is transferred, via a control valve such as a one-way valve, to the second set of tubes 17 of the second vessel 3.2 where the hydrogen is absorbed by the second stage metal hydride, and high pressure hydrogen is desorbed from the second stage metal hydride in the second set of tubes 17 of the first vessel 3.1 and transferred, through a control valve such as a one-way valve, to the hydrogen gas outlet 26 of the arrangement 1.

During Steps 4 and 1:
Low pressure hydrogen, from the hydrogen gas inlet 24 of the arrangement 1, is absorbed by the first stage metal hydride in the first set of tubes 15 of the third vessel 3.3, and medium pressure hydrogen is desorbed from the first stage metal hydride in the first set of tubes 15 of the fourth vessel 3.4, and medium pressure hydrogen, from the first set of tubes 15 of the fourth vessel 3.4, is transferred, via a control valve such as a one-way valve, to the second set of tubes 17 of the third vessel 3.3 where the hydrogen is absorbed by the second stage metal hydride, and high pressure hydrogen is desorbed from the second stage metal hydride in the second set of tubes 17 of the fourth vessel 3.4 and transferred, through a control valve such as a one-way valve, to the hydrogen gas outlet 26 of the arrangement 1.

In this manner, a continuous flow of hydrogen can be achieved from the hydrogen gas inlet 24 to the hydrogen gas outlet 26 of the arrangement 1, since at any time, a first set of tubes 15 of one of the vessels 3.1-3.4 will receive hydrogen from the hydrogen gas inlet 24 and hydrogen will be transferred from a second set of tubes 17 of one of the vessels 3.1-3.4 to the hydrogen gas outlet 26 of the arrangement 1.

An additional advantage lies within the overall thermal management. At any time step, two out of four vessels are cooled, and two out of four vessels are heated. This allows for a stable heating and cooling of the vessels 3.1-3.4 resulting in a thermal balance over time.

The method described above can be performed on an arrangement 1 as illustrated in FIG. 4, as well as on an arrangement 1 as illustrated in FIG. 5. However, as understood by those skilled in the art, arrangements 1 according to embodiments illustrated in FIG. 5 may provide for extended operational flexibility and the continuous flow of hydrogen may be achieved by transferring hydrogen between vessels in an alternative manner as the one described above, without departing from the scope of this disclosure.

Figure 6:
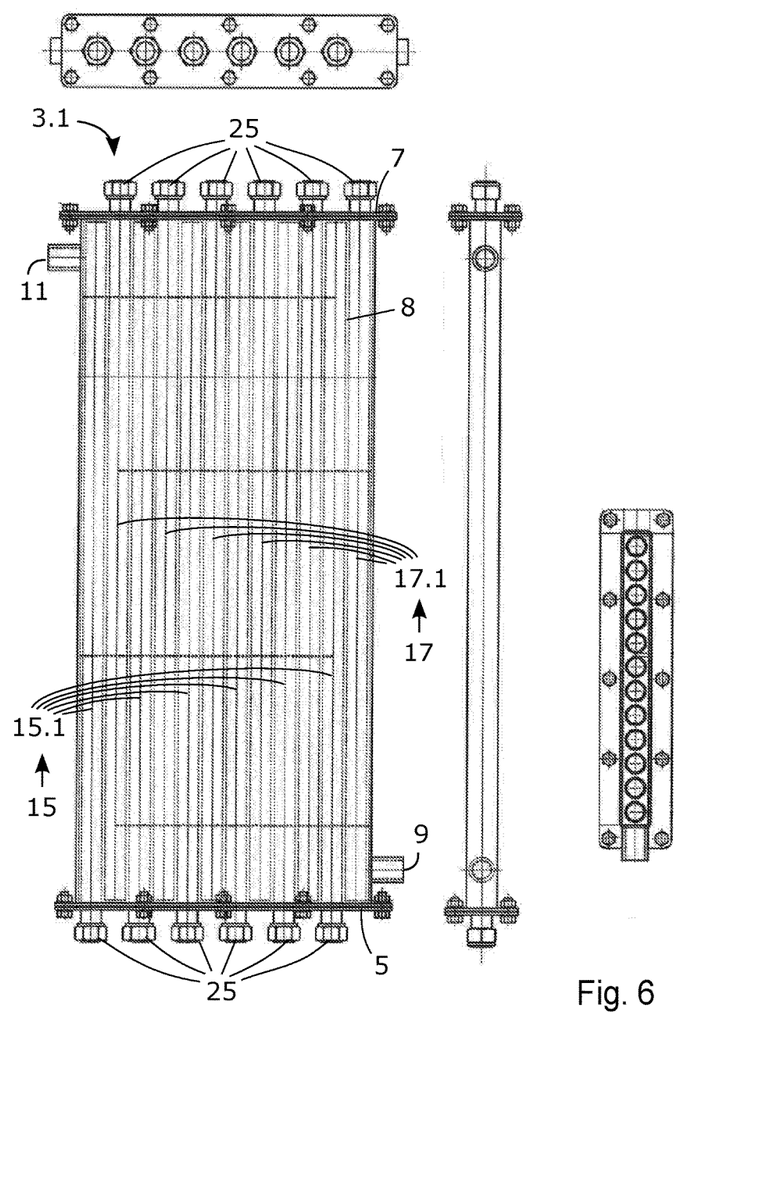
FIG. 6 illustrates a vessel according to some embodiments.

FIG. 6 illustrates a vessel 3.1 according to some embodiments. The vessel 3.1 has a first end 5, a second end 7 and an interior volume 8. The vessel 3.1 comprises a heat exchange fluid inlet 9 and a heat exchange fluid outlet 11 by which heat exchange fluid is arranged to be transferred, by heat exchange fluid transferring means, through the interior volume 8 of the vessel 3.1. A first set of tubes 15 extends into the interior volume 8 from the first end 5 of the vessel 3.1. A second set of tubes 17 extends into the interior volume 8 from the second end 7 of the vessel 3.1. Tubes 15.1 of the first set of tubes 15 and tubes 17.1 of the second set of tubes 17 each comprise a metal hydride. Fittings 25 are arranged to allow individual access to the metal hydride of the tubes 15.1, 17.1 of the first set of tubes 15 and the second set of tubes 17. Thereby, assembling, disassembling, maintenance and service, such as replacement of metal hydride is facilitated.

As illustrated in FIG. 6, the vessel 3.1 has an essentially flat design in the sense that in a cross section of the vessel 3.1, the extension of the vessel 3.1 is essentially greater in a first direction than in a second direction, where the second direction is perpendicular to the first direction. Further, tubes 15.1 of the first set of tubes 15 and tubes 17.1 of the second set of tubes 17 are interpositioned between each other such that there is one tube in the second direction and several tubes in the first direction. Thus, as is illustrated in FIG. 6, tubes 15.1 of the first set of tubes 15 and tubes 17.1 of the second set of tubes 17 may be tandemly arranged in the first direction within the interior volume of the vessel 3.1 in an alternating manner. Furthermore, as illustrated in FIG. 6, the number of tubes extending into the interior volume 8 from the first end 5 of the vessel 3.1 may correspond to the number of tubes extending into the interior volume 8 from the second end 7 of the vessel 3.1. In embodiments where the vessel 3.1 has an essentially flat design, the vessel 3.1 may better meet spatial requirements at a site where the vessel 3.1 is to be used. In addition, in embodiments where the hydrogen storage and release arrangement comprises two or more vessels 3.1, such arrangement may occupy less space. Further, in case of a flat design of the vessel 3.1, embodiments comprising manifolds may be extra advantageous due to simplified construction, manufacturing and assembly of the arrangement. Still further, in embodiments where the vessel 3.1 has an essentially flat design, manufacturing cost of the vessel 3.1 may be reduced due to a simplified design.

Figure 7:
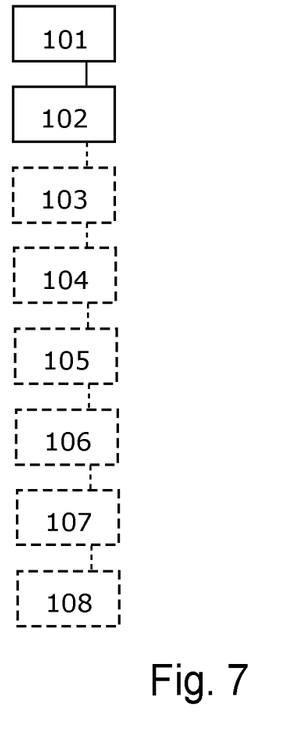
FIG. 7 illustrates a method for storing and releasing hydrogen using a hydrogen storage and release arrangement.

FIG. 7 illustrates a method for storing and releasing hydrogen using a hydrogen storage and release arrangement. The arrangement comprises a vessel having a first end, a second end and an interior volume. The vessel further comprises a heat exchange fluid inlet and a heat exchange fluid outlet. The arrangement further comprises a first set of tubes extending into the interior volume from the first end of the vessel. Tubes of the first set of tubes each comprise a metal hydride and ducts for supplying and removing hydrogen gas to and from the metal hydride. The arrangement further comprises a second set of tubes extending into the interior volume from the second end of the vessel. Tubes of the second set of tubes each comprise a metal hydride and ducts for supplying and removing hydrogen gas to and from the metal hydride. The metal hydride of the first set of tubes and the metal hydride of the second set of tubes are arranged to absorb and desorb hydrogen gas in response to temperature changes caused by the heat exchange fluid. The method comprises:

transferring 101 heat exchange fluid through the interior volume of the vessel, using heat exchange fluid transferring means, and absorbing and desorbing 102 hydrogen gas in response to temperature changes caused by the heat exchange fluid, using the metal hydride of the first set of tubes and the metal hydride of the second set of tubes.

The method may further comprise:

selectively transferring 103 heat exchange fluid having at least a lower heat exchange fluid temperature $T_L$ and a higher heat exchange fluid temperature $T_H$, using the heat exchange fluid transferring means, absorbing 104 hydrogen gas at a temperature equivalent to the lower heat exchange fluid temperature $T_L$, using the metal hydride of the first set of tubes and the metal hydride of the second set of tubes, and desorbing 105 hydrogen gas at a temperature equivalent to the higher heat exchange fluid temperature $T_H$, using the metal hydride of the first set of tubes and the metal hydride of the second set of tubes.

The arrangement may further comprise a first vessel and a second vessel where ducts of a first set of tubes of the first vessel are connected to ducts of a second set of tubes of the second vessel, and the method may further comprise:

transferring 106 hydrogen gas from the first set of tubes of the first vessel to the second set of tubes of the second vessel during, or after, a desorbing of the hydrogen gas in the first set of tubes of the first vessel.

The arrangement may further comprise a third vessel and a fourth vessel where ducts of a first set of tubes of the third vessel are connected to ducts of a second set of tubes of the fourth vessel, and the method may further comprise:

transferring 107 hydrogen from the first set of tubes of the third vessel to the second set of tubes of the fourth vessel during, or after, a desorbing of the hydrogen gas in the first set of tubes of the third vessel.

The arrangement may further comprise two or more vessels and where the method further comprises:

alternately transferring 108 heat exchange fluid having at least a lower heat exchange fluid temperature $T_L$ and a higher heat exchange fluid temperature $T_H$ through interior volumes of two or more vessels in cycles having an offset to each other, using the heat exchange fluid transferring means.

Respective method step 101-108 is illustrated in FIG. 7 by a box. A method step illustrated by a box with broken lines may be a non-mandatory method. The method illustrated may be performed by performing the method steps 101 and 102 and one or more of the method steps 103-108. As illustrated by the dotted lines between the boxes, the method steps need not be performed in a sequence of successive steps.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. A hydrogen storage and release arrangement comprising;
    a vessel, the vessel having a first end, a second end, and an interior volume, the vessel further including a heat exchange fluid inlet and a heat exchange fluid outlet by which heat exchange fluid is arranged to be transferred, by a heat exchange fluid transferring means, through the interior volume of the vessel, the arrangement further including;
    a first set of tubes, where tubes of the first set of tubes each includes a metal hydride,
    a second set of tubes, where tubes of the second set of tubes each includes a metal hydride, where the metal hydride of the first set of tubes and the metal hydride of the second set of tubes are arranged to absorb and desorb hydrogen gas in response to temperature changes caused by the heat exchange fluid, and where the arrangement includes ducts for supplying and removing hydrogen gas to and from the metal hydride of the first set of tubes and ducts for supplying and removing hydrogen gas to and from the metal hydride of the second set of tubes, where the first set of tubes extends into the interior volume from the first end of the vessel and the second set of tubes extends into the interior volume from the second end of the vessel, where the arrangement includes fittings allowing access to the metal hydride of the tubes of the first set of tubes and the second set of tubes; and
    wherein the tubes of the first set of tubes and the tubes of the second set of tubes are interpositioned between each other, within the interior volume, such that each tube of the first set of tubes has a larger number of adjacent tubes from the second set of tubes than from the first set of tubes and such that each tube of the second set of tubes has a larger number of adjacent tubes from the first set of tubes than from the second set of tubes.

2. The arrangement of claim 1, wherein the absorption of hydrogen gas constitutes storage of hydrogen gas and the desorption of hydrogen gas constitutes release of hydrogen gas.

3. The arrangement of claim 1, wherein the second end is opposite to the first end and where tubes of the second set of tubes are essentially parallel to the tubes of the first set of tubes.

4. The arrangement of claim 1, wherein the heat exchange fluid transferring means is arranged to selectively transfer heat exchange fluid having at least a lower heat exchange fluid temperature ($T_L$) and a higher heat exchange fluid temperature ($T_H$), where the metal hydride of the first set of tubes and the metal hydride of the second set of tubes are arranged to absorb hydrogen gas at a temperature equivalent to the lower heat exchange fluid temperature ($T_L$) and arranged to desorb hydrogen gas at a temperature equivalent to the higher heat exchange fluid temperature ($T_H$).

5. The arrangement of claim 1, wherein the tubes of the first set of tubes each includes a first metal hydride and tubes of the second set of tubes each includes a second metal hydride where the second metal hydride has a higher at least one of absorption and desorption pressure than the first metal hydride.

6. The arrangement of claim 1, further comprising a first vessel and a second vessel where ducts of a first set of tubes of the first vessel are connected to ducts of a second set of tubes of the second vessel, and where hydrogen gas is arranged to be transferred from the first set of tubes of the first vessel to the second set of tubes of the second vessel during, or after, a desorption phase of the hydrogen gas in the first set of tubes of the first vessel.

7. The arrangement of claim 6, further comprising a third vessel and a fourth vessel where ducts of a first set of tubes of the third vessel are connected to ducts of a second set of tubes of the fourth vessel, and where hydrogen gas is arranged to be transferred from the first set of tubes of the third vessel to the second set of tubes of the fourth vessel during, or after, a desorption phase of the hydrogen gas in the first set of tubes of the third vessel.

8. The arrangement of claim 1, further comprising two or more vessels and where the heat exchange fluid transferring means is arranged to alternately transfer heat exchange fluid having at least a lower heat exchange fluid temperature ($T_L$) and a higher heat exchange fluid temperature ($T_H$) through interior volumes of the two or more vessels in cycles having an offset to each other.

9. The arrangement of claim 1, wherein the tubes of the first set of tubes and the second set of tubes each include heat conductivity increasing means arranged to increase heat conductivity between the heat exchange fluid and the metal hydride.

10. The arrangement of claim 9, wherein the heat conductivity increasing means further includes an insert, such as a copper wire.

11. The arrangement of claim 1, wherein the ducts of the first set of tubes and the second set of tubes are provided with flow control valves arranged to admit controlling of flow of hydrogen within the ducts.

12. The arrangement of claim 1, wherein the arrangement is arranged to increase pressure of hydrogen gas from a lower pressure level to a higher pressure level.

* * * * *